(12) United States Patent
Iwamoto et al.

(10) Patent No.: US 9,699,419 B2
(45) Date of Patent: Jul. 4, 2017

(54) IMAGE PROCESSING APPARATUS AND IMAGE PROCESSING METHOD

(71) Applicant: CANON KABUSHIKI KAISHA, Tokyo (JP)

(72) Inventors: Takayuki Iwamoto, Kawasaki (JP); Yasuo Katano, Kawasaki (JP); Tsuyoshi Kuroki, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 519 days.

(21) Appl. No.: 13/854,479

(22) Filed: Apr. 1, 2013

(65) Prior Publication Data

US 2013/0265434 A1    Oct. 10, 2013

(30) Foreign Application Priority Data

Apr. 6, 2012   (JP) ................................. 2012-087934
Jan. 31, 2013  (JP) ................................. 2013-017636

(51) Int. Cl.
  *H04N 7/18* (2006.01)
  *G06K 9/00* (2006.01)

(52) U.S. Cl.
  CPC ......... *H04N 7/183* (2013.01); *G06K 9/00342* (2013.01); *G06K 9/00771* (2013.01)

(58) Field of Classification Search
  CPC ...... H04N 7/183; H04N 7/18; G06K 9/00771; G06K 9/00342
  USPC ....................................................... 348/157
  See application file for complete search history.

(56) References Cited

U.S. PATENT DOCUMENTS

| | | | | |
|---|---|---|---|---|
| 5,926,117 A * | 7/1999 | Gunji | ...................... | G01S 19/04 340/988 |
| 6,162,123 A * | 12/2000 | Woolston | ................ | A63F 13/10 273/148 B |
| 7,094,164 B2 * | 8/2006 | Marty et al. | .................. | 473/416 |
| 7,515,735 B2 | 4/2009 | Miyamori | | |
| 7,558,404 B2 * | 7/2009 | Ma | ..................... | G06K 9/00342 348/157 |

(Continued)

FOREIGN PATENT DOCUMENTS

| | | |
|---|---|---|
| JP | 4482690 B2 | 6/2010 |
| JP | 2012-048691 A | 3/2012 |
| WO | 2012/029518 A1 | 3/2012 |

OTHER PUBLICATIONS

D. Lowe, "Distinctive Image Features from Scale-Invariant Keypoints", International Journal of Computer Vision, 60, 2, pp. 91-110, 2004.

(Continued)

*Primary Examiner* — Tung Vo
*Assistant Examiner* — Zaihan Jiang
(74) *Attorney, Agent, or Firm* — Fitzpatrick, Cella, Harper & Scinto

(57) ABSTRACT

An image of each frame output from an image sensing device is sequentially acquired. A situation appearing in the image is recognized through recognition processing performed on the image, and, if the recognized situation is a prescribed situation, an object of a type related to the prescribed situation is detected from the image and from an image of each frame containing the image. A detection position, in the image, of each object is used to determine whether the objects come in contact with each other in a physical space.

15 Claims, 17 Drawing Sheets

(56) References Cited

U.S. PATENT DOCUMENTS

| | | | |
|---|---|---|---|
| 9,053,562 B1* | 6/2015 | Rabin et al. | |
| 2005/0134685 A1* | 6/2005 | Egnal | H04N 7/181 348/157 |
| 2010/0026809 A1* | 2/2010 | Curry | 348/157 |
| 2010/0053331 A1* | 3/2010 | Accurso | H04N 5/23203 348/157 |
| 2010/0063627 A1* | 3/2010 | Kitahama | A61H 3/061 700/253 |
| 2011/0276396 A1* | 11/2011 | Rathod | G06F 17/30867 705/14.49 |
| 2011/0299729 A1* | 12/2011 | Dawe | A63B 24/0003 382/103 |
| 2013/0051662 A1 | 2/2013 | Shiozaki et al. | |
| 2013/0066448 A1* | 3/2013 | Alonso | H04Q 9/00 700/91 |
| 2013/0120582 A1* | 5/2013 | Daniels et al. | 348/157 |
| 2014/0315610 A1* | 10/2014 | Shachar | G06T 7/2093 463/7 |

OTHER PUBLICATIONS

P. Viola, et al., "Rapid Object Detection using a Boosted Cascade of Simple Features", IEEE Computer Society Conference on Computer Vision and Pattern Recognition (CVPR 2001).

L. Bourdev, et al., "Poselets: Body Part Detectors Trained Using 3D Human Pose Annotations", ICCV 2009.

N. Dalal, et al., "Histograms of Oriented Gradients for Human Detection", CVPR 2005.

P.F. Felzenszwalb, et al., "Object Detection with Discriminatively Trained Part Based Models", PAMI 2009.

Japanese Office Action dated Dec. 19, 2016 in Japanese Application No. 2013-017636.

* cited by examiner

FIG. 3

| EVENT | CONTACT DETERMINATION TARGET | ACCELERATION DETERMINATION TARGET |
|---|---|---|
| SLIDING TACKLE | FOOT, BALL | BALL |
| HANDBALL | HAND, ARM, BALL | BALL |
| ... | | |

IMAGE PROCESSING APPARATUS AND IMAGE PROCESSING METHOD

BACKGROUND OF THE INVENTION

Field of the Invention

The present invention relates to technology for using video recognition to interpret events that occur in video images.

Description of the Related Art

Heretofore, methods that involve capturing scenes using a camera and interpreting phenomena that occur in the scenes through video recognition are known. For example, Japanese Patent No. 4482690 discloses technology for specifying hitting time information from the occluded state of an implement or the like, and recognizing the movement of a player based on the position of the implement at the hitting time and rule information of the sport. Also, some surveillance cameras have functions of analyzing captured video images and detecting events such as violent actions, removal or abandonment of objects, or the like.

In such video analysis, processing such as detecting the contact state between objects in a video image and performing a more detailed interpretation of an event that occurred in the video image was conventionally not performed.

SUMMARY OF THE INVENTION

The present invention has been made in view of such problems, and provides technology for performing a more detailed interpretation of an event that occurred in a video image, by determining the contact state between objects detected in the video image.

According to one aspect of the present invention, there is provided an image processing apparatus comprising: a unit that sequentially acquires an image of each frame output from an image sensing device; a detection unit that recognizes a situation appearing in the image, through recognition processing performed on the image, and, if the recognized situation is a prescribed situation, detects an object of a type related to the prescribed situation from the image and from an image of each frame containing the image; and a determination unit that determines whether objects come in contact with each other in a physical space, based on a result of the detection by the detection unit.

Further features of the present invention will become apparent from the following description of exemplary embodiments with reference to the attached drawings.

BRIEF DESCRIPTION OF THE DRAWINGS

FIG. 3 is a diagram showing an exemplary configuration of table information held by a rule storage unit 204.

DESCRIPTION OF THE EMBODIMENTS

Hereinafter, embodiments of the present invention will be described with reference to the attached drawings. Note that the embodiments described below show examples of the present invention being carried out in specific manner, and are specific embodiment examples of configurations described in the claims.

First Embodiment

Overview of Present Embodiment

First, an overview of the present embodiment will be described. In the present embodiment, it is determined whether a sliding action during a soccer game is a foul, from the images of individual frames obtained from a single image sensing device that is capturing the soccer game.

Figure 1A:
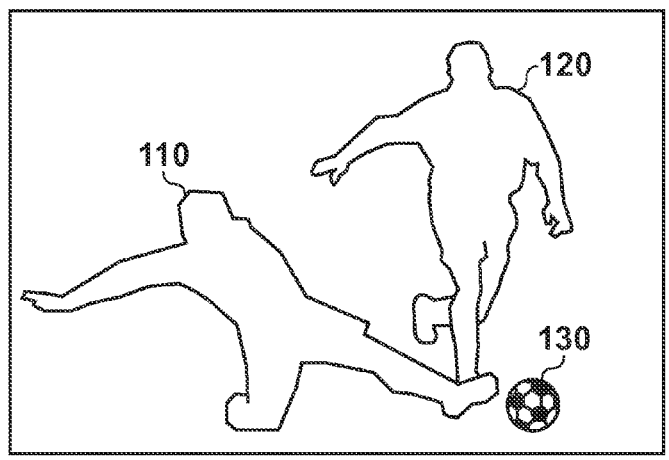
FIGS. 1A to 1C are diagrams showing three frames of images capturing a situation where a person makes a sliding tackle.
Figure 1B:
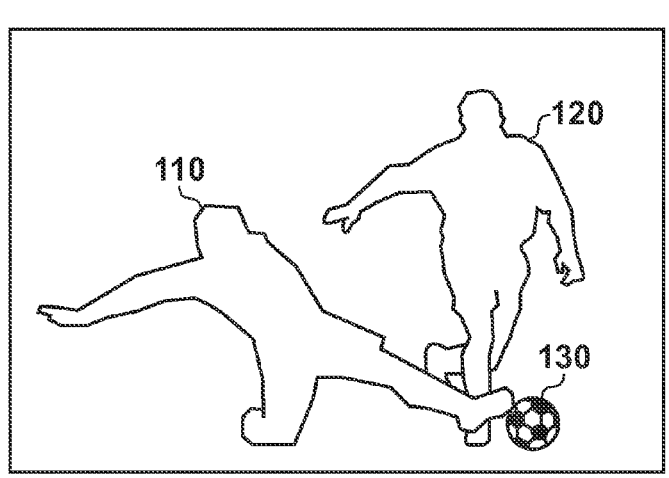
Figure 1C:
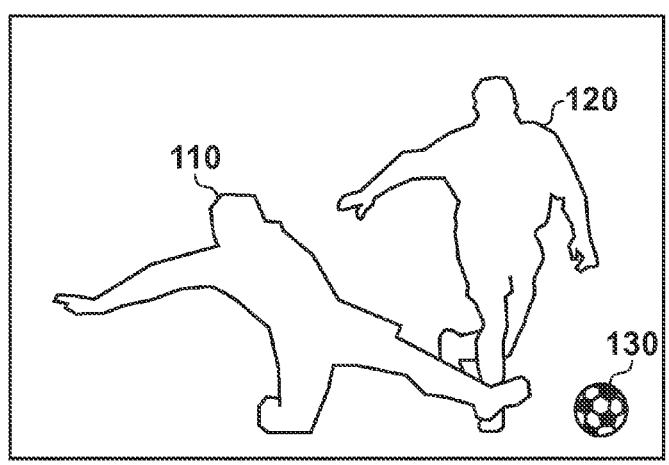

FIGS. 1A to 1C show three frames of images capturing a situation where a person 110 makes a sliding tackle during a soccer game. A person 120 is dribbling a ball 130, and the person 110 makes a sliding tackle in order to win the ball 130. Here, FIG. 1A shows the image of frame 1, FIG. 1B shows the image of frame 2 that follows frame 1, and FIG. 1C shows the image of frame 3 that follows frame 2. Note that frame 1 and frame 2 are not adjacent frames, and that frame 2 and frame 3 are not adjacent frames. That is, frames 1, 2 and 3 are all frames sampled at a suitable interval, with the sampling rate of the image sensing device being high enough that one or more frames exist between frame 1 and frame 2 and between frame 2 and frame 3.

Also, it is assumed that the person 110 and the person 120 become entangled after frame 3, and that the person 120 goes down. According to the rules of soccer, a foul is committed when the player making the sliding tackle contacts the other player before contacting the ball.

After detecting that the person 120 has gone down, the image processing apparatus according to the present embodiment determines whether the foot of the person 110 contacted the ball 130, using the images of past frames previous to (frames captured before) the frame in which the person 120 was detected going down. According to this determination, the sliding tackle made by the person 110, which causes the person 120 to go down, is determined to be within the rules, and the contact site serving as the basis of the determination is displayed in the image.

Exemplary Functional Configuration and Operations of Image Processing Apparatus According to Present Embodiment Next, an exemplary functional configuration of the behavior recognition apparatus according to the present embodiment that functions as an image processing apparatus will be described using the block diagram of FIG. 2.

The image input unit 201 sequentially acquires an image of each frame output from an image sensing device capturing a game of soccer serving as an exemplary sport, and stores the acquired image in an video storage unit 202 as well as outputting the acquired image to the event detection unit 203.

The event detection unit 203 detects an event occurring in the image received from the image input unit 201, by recognizing a situation that appears in the image, through recognition processing performed on the image. For example, in the case of soccer, scenes such as a player going down, a sliding tackle, a handball, a shot, fighting for the ball in the air, a throw-in and the like correspond to events. Event detection is performed by the following method that uses the concept of a bag-of-keypoints and the Hidden Markov Model (HMM).

First, a set Fi (={f1, f2, . . . , fN}) of image features (feature vectors) f is extracted from an image Ii of an i-th frame. Here, the image features of a keypoint base, such as SIFT described in Document 1 below, can be used for the image features f.

Document 1: David Lowe, "Distinctive Image Features from Scale-Invariant Keypoints", International Journal of Computer Vision, 60, 2, pp. 91-110, 2004.

Next, a distance d between an feature vector which is an element of Fi and each of K feature vectors {g1, g2, . . . , gK} prepared in advance is calculated, and a closest vector gj is searched for. That is, the following equation is calculated.

$$j = \underset{1 \leq k \leq K}{\operatorname{argmin}} d(f, g_k) \qquad \text{Equation 1}$$

1 is then added to a j-th bin of a histogram hi having K bins. This processing is performed for all of the feature vectors which are elements of Fi to complete the histogram hi. The histogram hi obtained here is a codeword obtained from the image Ii.

Furthermore, which of the M histograms O1, O2, . . . , OM prepared in advance is most similar to the obtained histogram hi is determined using a histogram intersection. The most similar O is given as symbol O(i) obtained from the image Ii.

A symbol series O1:T={O(1), O(2), . . . , O(T)} from t=1 to t=T is obtained, by performing the above processing for the image {I1, I2, . . . , IT} of each frame from t=1 to t=T (current frame).

For the series O1:T of the obtained symbol and HMMλl serving as a learned model for respective events λl, λc having a highest probability Pr(λl|O1:T) are specified by calculating the following equation.

$$c = \underset{l}{\operatorname{argmax}} Pr(\lambda_l \mid O_{1:T}) \qquad \text{Equation 2}$$

According to this equation, because l at which the probability Pr(λl|O1:T) is highest is c, λc is detected as the event occurring in the image of the current frame. If, however, the probability Pr(λc|O1:T) derived with this equation is less than a predetermined threshold, it is determined that no event was detected.

According to such an event detection method, it is possible to detect that an event or an event similar to that event has occurred in the image. However, generally it is difficult to determine whether that event is in accordance with an actual rule. For example, in the case of a sliding action, similar image features appear across the entire screen with both a sliding tackle that is foul and a legitimate sliding tackle, making it difficult to accurately discriminate the legitimacy of the action with only this event detection method. Also, in relation to a handball, it is possible with this event detection method to detect an event that appears to be a handball, that is, the ball striking the body, but the question of whether the ball striking the body was actually a foul requires that it be determined whether the ball came in contact with part of the arm. Thus, the scene detected by this event detection method needs to be subject determination processing again using following contact determination processing.

A rule storage unit 204 manages the types of objects to be detected from an image, in the case where the event is detected from the image, with respect to each of a plurality of predetermined types of events (all of λl in the above case). For example, the rule storage unit 204 holds the table information illustrated in FIG. 3.

The table information shown in FIG. 3 is table information for determining whether a foul has been committed in a soccer game. However, in order to determine whether a foul has been committed in another sport, an event that could occur in that sport, a target for performing contact determination when that event arises, and a target whose movement is determined using information such as velocity and/or acceleration need to be registered in the rule storage unit 204.

According to the table information in FIG. 3, "foot" and "ball" are registered as contact determination targets for the event "sliding tackle". That is, "foot" and "ball" are registered as objects to be detected from an image in order to determine whether contact was actually made in physical space, in the case where a "sliding tackle" is detected as the event from an image. Also, "ball" is registered as an acceleration determination target for the event "sliding tackle". That is, "ball" is registered as an object for determining acceleration in order to determine whether contact was actually made in physical space, in the case where a "sliding tackle" is detected as the event from an image. Note that a configuration is possible in which a determination target for another index is registered instead of an acceleration determination target.

Returning to FIG. 2, an object detection unit 205 reads the image serving as the detection origin in which the event was detected by the event detection unit 203 from the video storage unit 202, and detects objects serving as contact determination targets that are registered in the above table information in association with the event from the read image. For example, in the case where the event detected by the event detection unit 203 is a "sliding tackle", the object detection unit 205 detects "foot" and "ball", which are the objects registered as contact determination targets in the above table information in association with "sliding tackle", from the image.

The detection of a specific object such as a ball can be performed using circle detection by Hough transform, for example. A ball can also be detected using a detector that has learned images of a ball clipped from a plurality of scenes as training samples, such as a face detection algorithm described in Document 2 below.

Document 2: Paul Viola and Michael J. Jones, "Rapid Object Detection using a Boosted Cascade of Simple Features", IEEE Computer Society Conference on Computer Vision and Pattern Recognition (CVPR 2001).

In relation to the detection of human body parts, for example, it is possible to use a detector that has learned, as training samples, only images of specific parts whose posture data is similar, from a dataset in which images of a person are paired with its 3D posture data, as with the method described in Document 3 below.

Document 3: Lubomir Bourdev and Jitendra Malik, "Poselets: Body Part Detectors Trained Using 3D Human Pose Annotations", ICCV 2009.

Figure 4A:
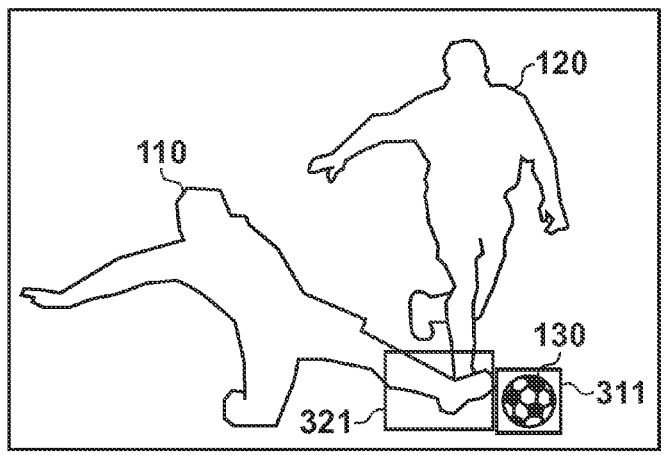
FIGS. 4A to 4C are diagrams showing detection windows.
Figure 4B:
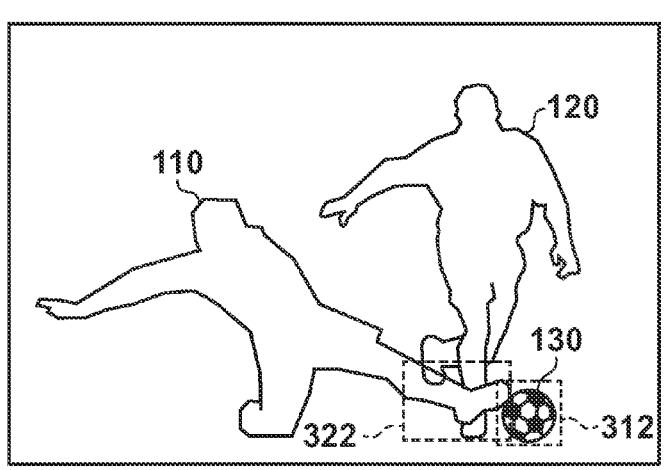

As shown in FIG. 4A, in the case where a "sliding tackle" is detected as an event from the image of frame 1, a region 321 of the "foot" and a region 311 of the "ball" are detected from the image. Also, as shown in FIG. 4B, in the case where a "sliding tackle" is detected as an event from the image of frame 2, a region 322 of the "foot" and a region 312 of the "ball" are detected from the image. Also, as shown in FIG. 4C, in the case where a "sliding tackle" is detected as an event from the image of frame 3, a region 323 of the "foot" and a region 313 of the "ball" are detected from the image.

Figure 4C:
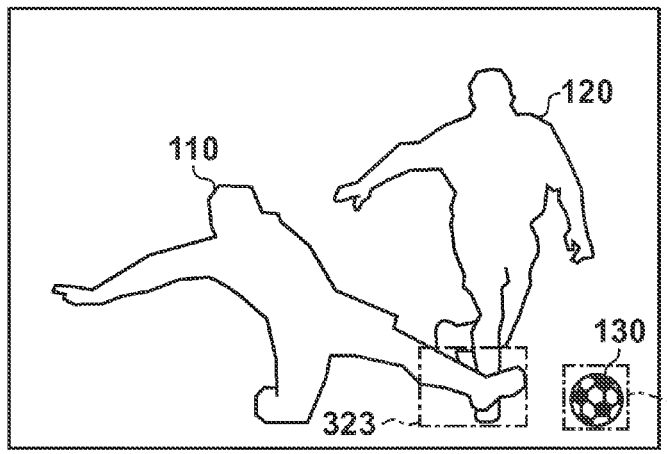

Note that while detection windows of the objects are derived as object detection results in FIGS. 4A to 4C, other methods of representing detection results are also conceivable, such as taking a region around the edge of an object as a detection result.

In this way, the object detection unit 205 detects objects that depend on the detected event from an image. Accordingly, any technology may be used that enables a similar object to be achieved.

Returning to FIG. 2, a contact determination unit 206 determines whether objects detected by the object detection unit 205 come in contact with each other in physical space. Here, operations of the contact determination unit 206 will be described taking, as an example, the case where a "sliding tackle" is detected as the event from an image and "foot" and "ball" are detected from the image. However, the following description can also be applied to contact determination of other objects, and other contact determination methods may be employed.

Assuming that the event detection unit 203 has detected a "sliding tackle" from the image of frame t, the object detection unit 205 detects a "foot" and a "ball" from the image, since the contact determination targets are "foot" and "ball". Because the acceleration determination target is "ball", the contact determination unit 206 derives velocity and acceleration in the image with respect to the "ball", and only derives velocity in the image with respect to the "foot", which is the contact determination target that is not an acceleration determination target.

Here, since it takes several frames from the beginning to the end of the sliding tackle, the sliding tackle would be expected to be detected continuously for several frames from the frame in which the sliding tackle was first detected. In view of this, assuming that a "sliding tackle" was detected from the image of frame t, a group of frames in which the "sliding tackle" was detected is specified from the video storage unit 202 by going back through past frames previous to frame t, and this group of frames is taken as the target of the following processing (target images). Accordingly, in the present embodiment, when an event is detected for a certain frame, that frame needs to be held in a suitable memory in association with the event detected from the frame. Also, in order to simplify the description, it will be assumed that a "sliding tackle" was detected in the images of frame 1 to frame t.

First, the contact determination unit 206 derives, for the image of each of frames 3 to t, the velocity and the acceleration of the "ball" and the velocity of the "foot" in the image. The velocity and the acceleration of the ball in the image of frame t can be derived, by using the detection positions of the "ball" detected by the object detection unit 205 from the respective images of frames t to (t−2). The position of "ball" detected from the image of frame t is given as $x_t$, the position of the "ball" detected from the image of frame (t−1) is given as $x_{t-\Delta t}$, and the position of the "ball" detected from the image of frame (t−2) is given as $x_{t-2\Delta t}$. At this time, a velocity $v_t$ and an acceleration $a_t$ of the "ball" in the image of frame t can be calculated by the following equation.

$$v_t = \frac{1}{\Delta t}(x_t - x_{t-\Delta t}),$$

$$a_t = \frac{1}{\Delta t^2}(x_t - 2x_{t-\Delta t} + x_{t-2\Delta t})$$

Equation 3

Here, Δ represents the inter-frame spacing. Also, if the position of the "foot" detected from the respective images of frames t and (t−Δt) is given as $x_t$ and $x_{t-\Delta t}$, the velocity of the "foot" in the image of frame t can be derived by equation 3. The velocity and the acceleration of the "ball" and the velocity of the "foot" in the image can be derived by performing this processing on the image of each of frames 3 to t.

Figure 5:
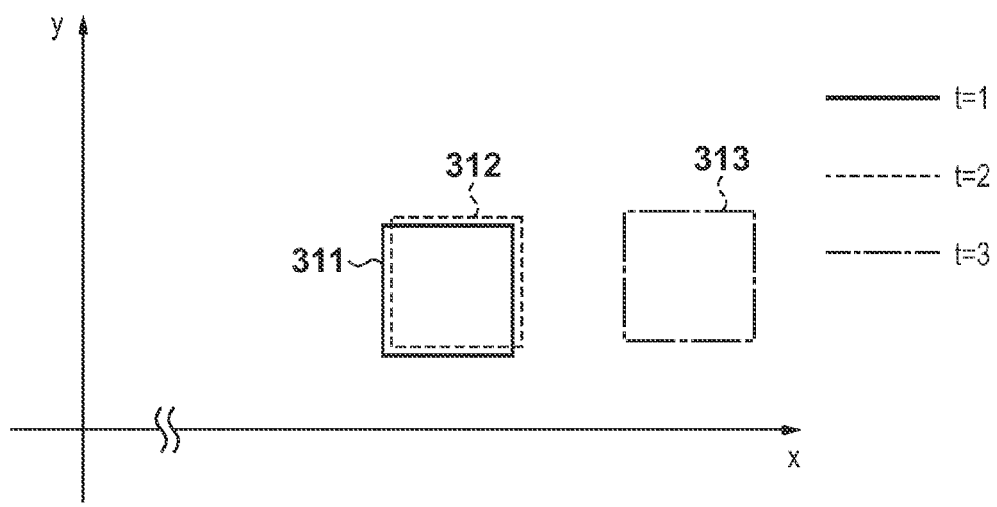
FIG. 5 is a diagram showing detection positions of a ball.
Figure 6A:
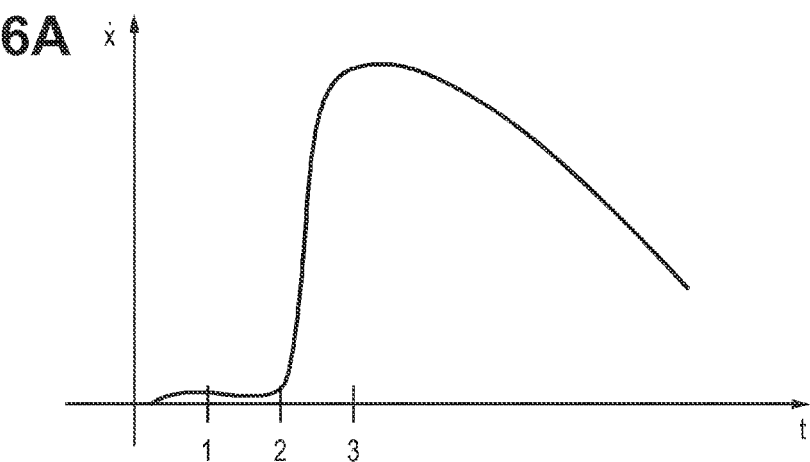
FIGS. 6A and 6B are diagrams showing velocity and acceleration of a ball.
Figure 6B:
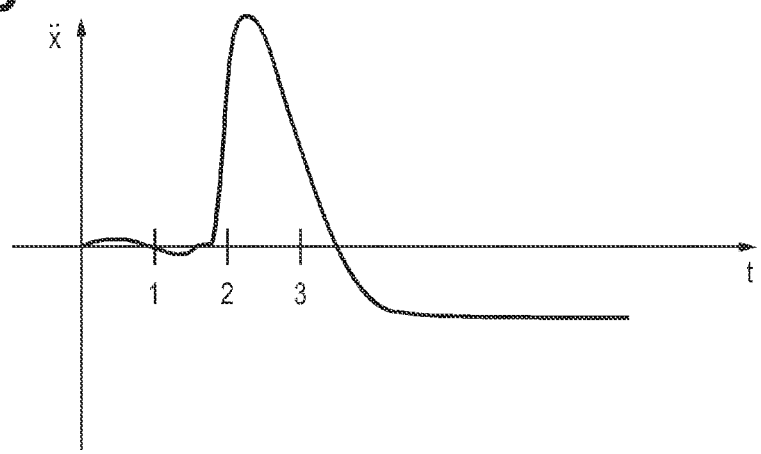

The detection position of the "ball" in the image of each of frames 1 to 3 is shown in FIG. 5. The vertical axis shows y-coordinate value and the horizontal axis shows x-coordinate value. Also, the velocity of the "ball" in the image of each frame is shown in FIG. 6A. In FIG. 6A, the vertical axis shows frame number and the horizontal axis shows velocity. Also, the acceleration of the "ball" in the image of each frame is shown in FIG. 6B. In FIG. 6B, the vertical axis shows frame number and the horizontal axis shows acceleration.

Also, the contact determination unit 206 derives a distance $d_t$ between a detection position $x_t^{ball}$ of the "ball" and a detection position $x_t^{foot}$ of the "foot" in the image, for the image of each of frames 3 to t. This calculation can be derived by calculating the following equation.

$$d_t = |x_t^{ball} - x_t^{foot}|$$

Equation 4

Figure 7:
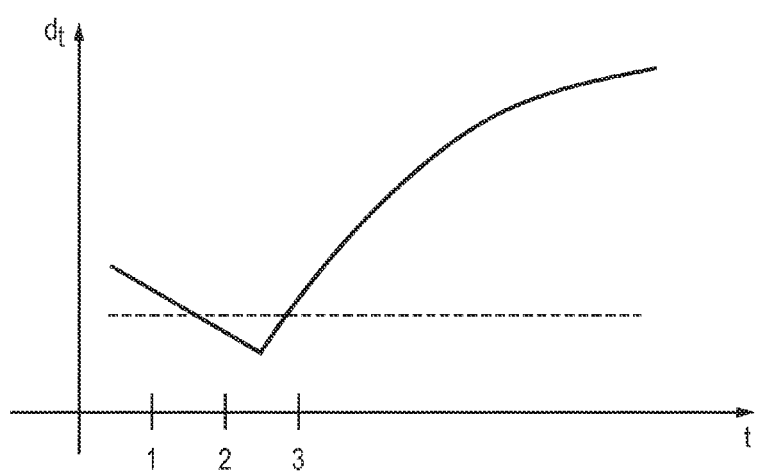
FIG. 7 is a diagram showing the distance between ball and foot.

The distance $d_t$ may be the distance between the respective detection windows of the "ball" and the "foot", or may be the distance between respective outlines of the "ball" and the "foot". The distance between a central position $x_t^{foot}$ of the detection window of the "foot" and a central position $X_t^{ball}$ of the detection window of the "ball" is shown in FIG. 7. In FIG. 7, the horizontal axis shows frame number and the vertical axis shows distance $d_t$.

Next, the contact determination unit 206 specifies the segment of t in which the derived distance $d_t$ is not more than a threshold. In the case of FIG. 7, the dotted line indicates the threshold, and the segment of t that is below the dotted line is specified in this case.

The contact determination unit 206 first determines whether a magnitude |ad| of the acceleration of the ball in frame t is greater than or equal to a threshold, where each frame number in the specified segment is again given as t. If the magnitude $|a_t|$ of the acceleration is greater than or equal to the threshold, it is determined whether the direction of the acceleration of the ball and the direction of the velocity of the foot in frame (t+1) are matched, by determining whether S in the following equation is greater than or equal to a threshold (>0).

$$S = \frac{v_{t+\Delta t}^{foot}}{|v_{t+\Delta t}^{foot}|} \cdot \frac{\alpha_{t+\Delta t}^{ball}}{|\alpha_{t+\Delta t}^{ball}|} \qquad \text{Equation 5}$$

The contact determination unit 206 then determines that the "foot" and the "ball" came in contact in frame t', if S is greater than or equal to the threshold at t=t'.

The result display unit 207 displays the image of the frame in which S is greater than or equal to the threshold on a display device connected to the behavior recognition apparatus 200. The form of display is not limited to a specific form of display, and the respective detection windows of the "foot" and the "ball" may, for example, be composited and displayed in the image, as shown in FIG. 4B. Also, display may be performed by playing back the images of several frames before and/or after the frame in which S is greater than or equal to the threshold in slow motion. The detection windows may, of course, be composited and displayed in the images of the frames played back in slow motion.

Figure 8:
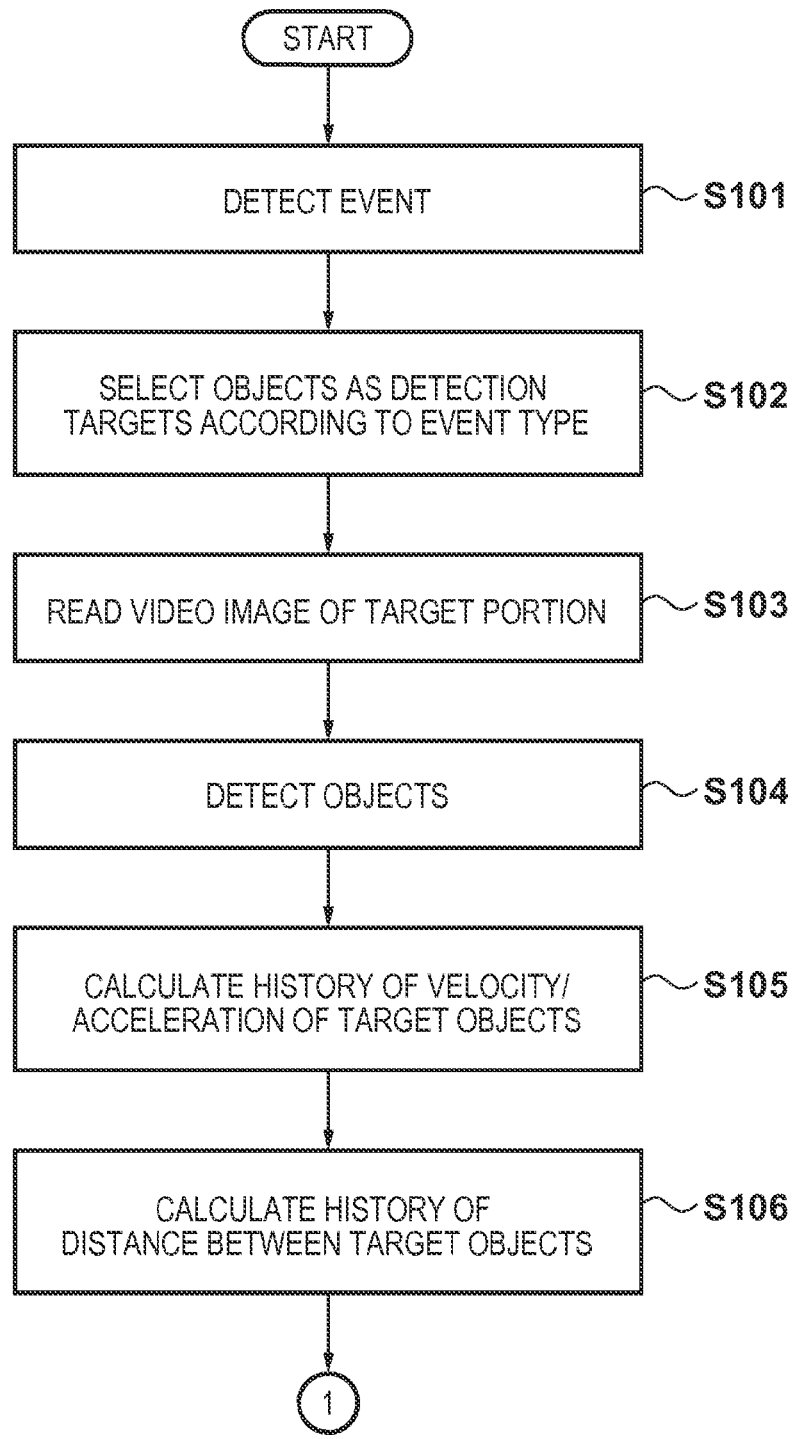
FIG. 8 is a flowchart of processing performed by the behavior recognition apparatus 200.
Figure 9:
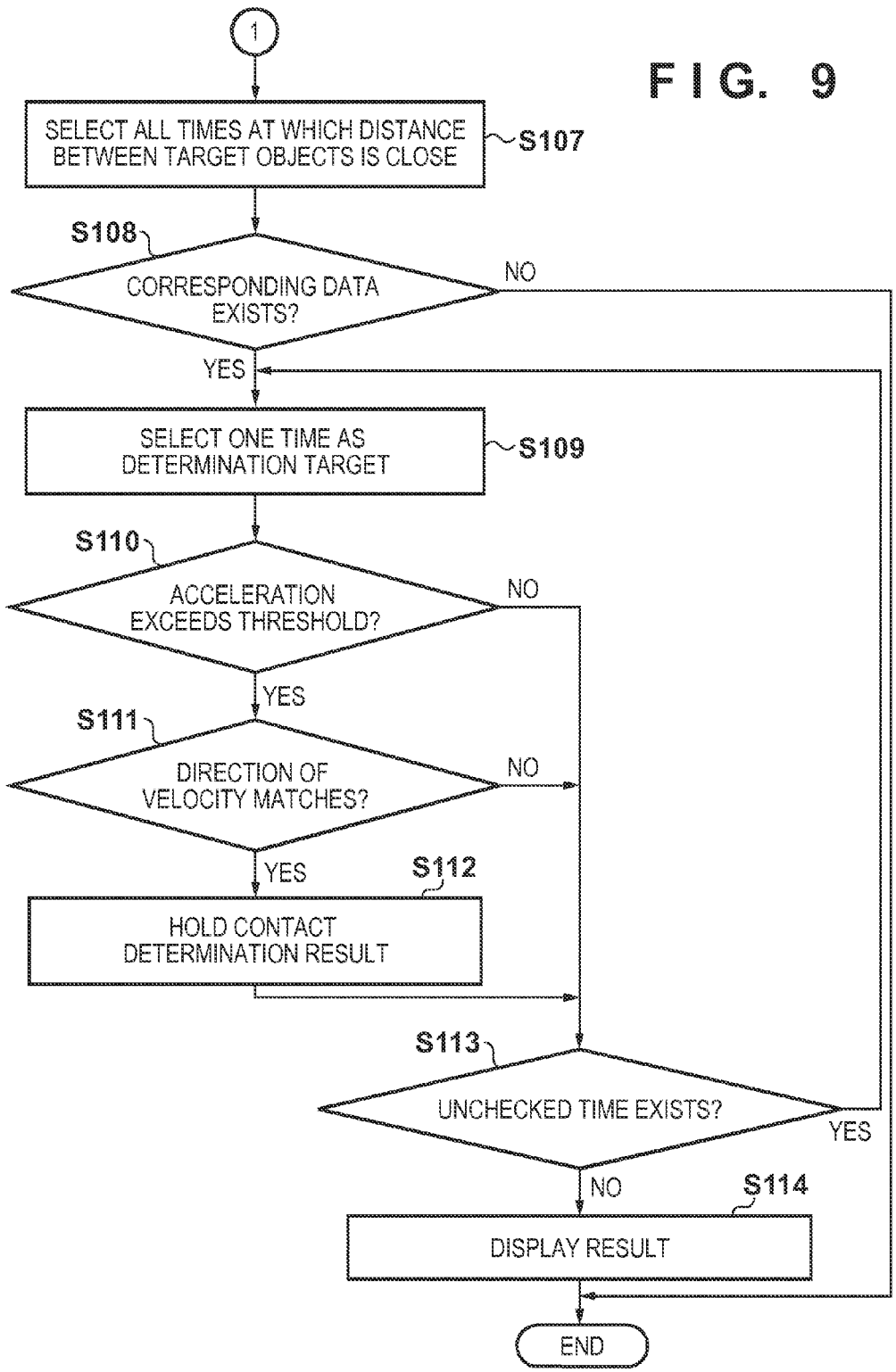
FIG. 9 is a flowchart of processing performed by the behavior recognition apparatus 200.

Next, the operations of the behavior recognition apparatus 200 described above will be described using the flowcharts of FIG. 8 and FIG. 9. Because the processing in accordance with the flowcharts of FIG. 8 and FIG. 9 is processing performed on one frame image, the processing in accordance with the flowcharts of FIG. 8 and FIG. 9 is actually performed with respect to each frame. In the following description, processing performed on the image of frame t will be described. Note that since the details of the processing in each step are as described above, only a brief description will be given here.

At step S101, the event detection unit 203 detects an event occurring in the image of frame t received from the image input unit 201.

At step S102, the object detection unit 205 specifies objects registered as contact determination targets in the rule storage unit 204 in association with the event detected at step S101.

At step S103, the object detection unit 205 goes back through past frames previous to frame t serving as the detection origin in which the event was detected, and reads, from the video storage unit 202, the group of frames (or a part of the group) in which the same event as the event detected at step S101 was detected.

At step S104, the object detection unit 205 detects the objects specified at step S102, from the image of each frame read at step S103 (including the image of frame t).

At step S105, the contact determination unit 206 derives, for the image of each frame read at step S103, the velocity and the acceleration (depending on the object, only the velocity), in the image, of each of the objects specified at step S102.

At step S106, the contact determination unit 206 derives, for the image of each frame read at step S103, the distance, in the image, between the detection positions of the objects specified at step S102.

At step S107, the contact determination unit 206 specifies the frame segment in which the distance derived at step S106 is not more than a threshold.

At step S108, the contact determination unit 206 determines whether there is a frame segment in which the distance derived at step S106 is not more than the threshold, that is, whether one or more frames were specified at step S107. If the determination result indicates that one or more frames were specified, the processing advances to step S109, and if one or more frames were not specified, the processing on this frame is ended.

At step S109, the contact determination unit 206 selects, as a selection frame, one unselected frame from the frames specified at step S107. At step S110, the contact determination unit 206 then determines whether the magnitude of the acceleration of a first object (the ball in the abovementioned example) in the image of the selection frame is greater than or equal to a threshold. If the determination result indicates that the magnitude of acceleration is greater than or equal to the threshold, the processing advances to step S111, and if the magnitude of acceleration is less than the threshold, the processing advances to step S113.

At step S111, the contact determination unit 206 determines whether the direction of the acceleration of the first object and the direction of the velocity of a second object (the foot in the above example) in a frame that is one frame after the selection frame are matched. That is, as described above, it is determined whether S is greater than or equal to a threshold (>0). If the determination result indicates that S is greater than or equal to the threshold, the processing advances to step S112, and if S is less than the threshold, the processing advances to step S113.

At step S112, the contact determination unit 206 stores information for specifying the selection frame, such as the frame number of the selection frame, in a memory that is accessible by the behavior recognition apparatus 200.

At step S113, the contact determination unit 206 determines whether all of the frames specified at step S107 have been selected as the selection frame. If the determination result indicates that all specified frames have been selected as the selection frame, the processing advances to step S114, and if there remains a frame that has not yet been selected, the processing returns to step S109.

At step S114, the result display unit 207 displays the images of frames specified by information recorded in the memory at step S112 on a display device connected to the behavior recognition apparatus 200.

That is, in the present embodiment, the image of each frame output from the image sensing device capturing the sports game is acquired sequentially. The situation in the image is recognized through recognition processing performed on the image, and if the recognized situation is a prescribed situation, objects of a type associated in advance with the prescribed situation are detected from the image and from each of the images in which the prescribed situation was recognized in past frames previous to the image. The detection positions of the objects are then used to determine whether these objects come in contact with each other in physical space.

More specifically, an image, among the above images, in which the distance between the detection positions in the respective images of the first object and the second object constituting the prescribed situation is not more than a threshold is set as a target image. If the magnitude of the acceleration of the first object in the target image is greater than or equal to a threshold, and an angle formed by a vector representing the acceleration and a vector representing the velocity of the second object in the target image is less than a threshold, it is determined that the respective objects come in contact with each other in physical space.

Second Embodiment

In the first embodiment, the images of frames captured by one image sensing device were processed, whereas in the present embodiment, a sports game is captured by a plurality of image sensing devices having respectively different viewpoints. The behavior recognition apparatus 200 selects an image sensing device that captures an image most suitable for contact determination, among the respective image sensing devices, and performs similar operations to the first embodiment using images captured by the selected image sensing device. Hereinafter, only differences from the first embodiment will be described, and the present embodiment is otherwise similar to the first embodiment unless particularly noted below.

The image input unit 201 sequentially acquires an image of each frame output from each of the plurality of image sensing devices, and stores the acquired image in the video storage unit 202 as well as outputting the acquired image to the event detection unit 203.

The event detection unit 203 detects an event occurring in the image received from the image input unit 201, by recognizing a situation appearing in the image, through recognition processing performed on the image. For example, assume that the event detection unit 203 has acquired the image of frame t from each of N image sensing devices (where N is a natural number greater than or equal to 2). At this time, the event detection unit 203 derives the above event occurrence probability (situation occurrence probability) $Pr^{(i)}(\lambda c|O1:T)$ for the image of frame t acquired from the i-th ($1 \le i \le N$) image sensing device. Assume that the highest probability among the event occurrence probabilities derived for i=1, 2, ..., N is $Pr^{(j)}(\lambda c|O1:T)$ ($1 \le i \le N$), and that $Pr^{(j)}(\lambda l|O1:T)$ is greater than or equal to a threshold. At this time, the event detection unit 203 determines that the event $\lambda c$ has occurred in the image of frame t acquired from the j-th image sensing device.

Although the present embodiment is otherwise similar to the first embodiment, the object detection unit 205, the contact determination unit 206 and the result display unit 207 all perform processing using images acquired from the j-th image sensing device, and do not use images acquired from image sensing devices other than the j-th image sensing device.

Third Embodiment

Figure 11:
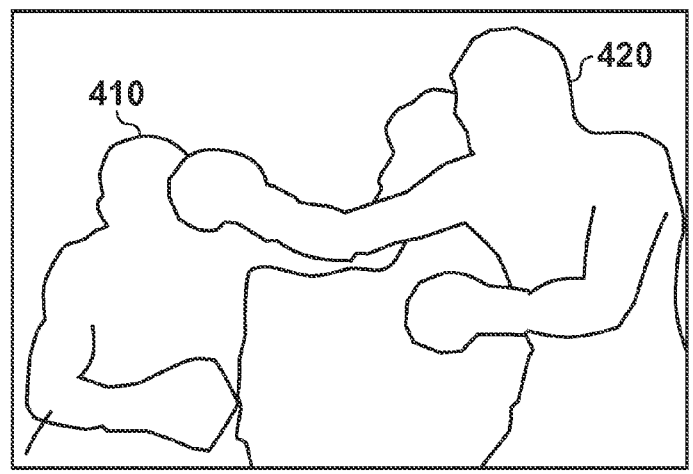
FIG. 11 is a diagram showing an image capturing a situation where a punch is thrown.
Figure 12:
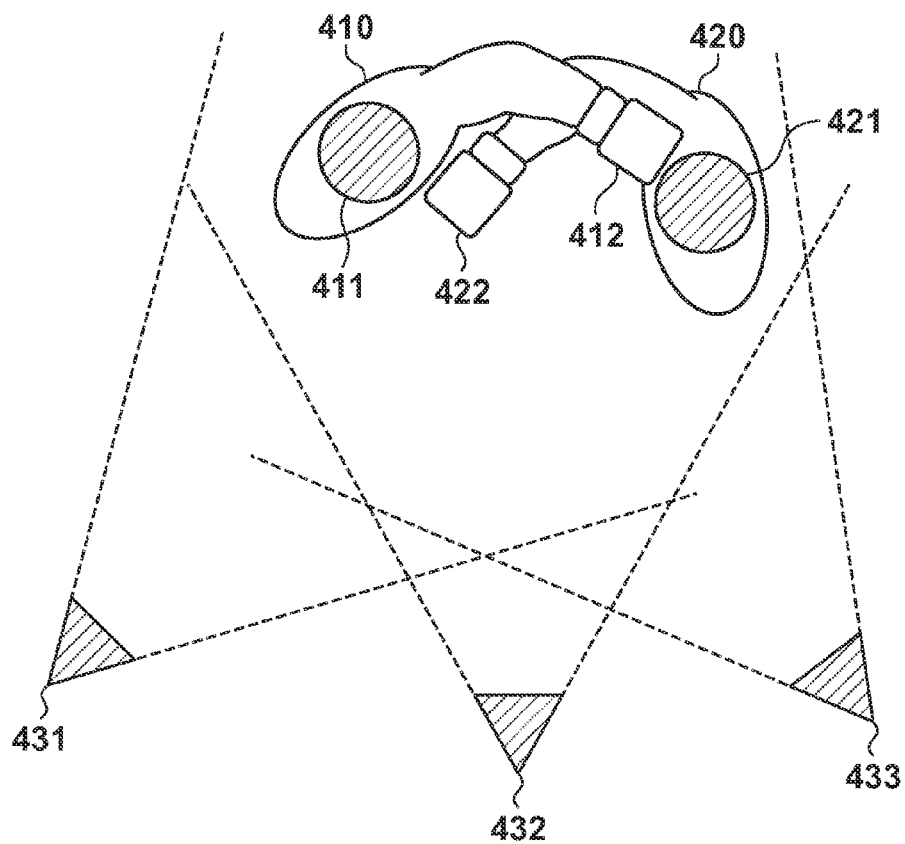
FIG. 12 is a schematic diagram of the situation in FIG. 11 viewed from above.

In the present embodiment, the landing of a punch in a boxing match is determined. FIG. 11 shows an image capturing a situation where a person 410 and a person 420 are trading punches during a boxing match. Also, FIG. 12 is a schematic diagram of the situation in FIG. 11 viewed from above. Reference numeral 411 denotes the head of the person 410 and 412 denotes the left first of the person 410. Also, reference numeral 421 denotes the head of the person 420 and 422 denotes the right first of the person 420. A camera 431, a camera 432 and a camera 433 are disposed around the person 410 and the person 420. Dotted lines extending from each camera indicate the angle of view of the camera. FIG. 11 shows an image captured by the camera 432. In the image in FIG. 11, overlap can be seen between the head 411 and the right first 422. Overlap between the head 411 and the right first 422 can also similarly be seen in the image obtained from the camera 433. However, from the viewpoint of the camera 431, the head 411 and the right first 422 do not overlap, and thus it is evident that contact is not made. The behavior recognition apparatus according to the present embodiment uses the above phenomena to determine the contact state between target objects.

Although a behavior recognition apparatus 200 having a similar configuration to the first embodiment is also used in the present embodiment, a plurality of image sensing devices are connected to the behavior recognition apparatus 200 in the present embodiment, similarly to the second embodiment.

The image input unit 201 sequentially acquires an image of each frame output from each of the plurality of image sensing devices, and stores the acquired image in the video storage unit 202 as well as outputting the acquired image to the event detection unit 203.

The event detection unit 203 detects an event occurring in the image received from the image input unit 201, by recognizing a situation appearing in the image, through recognition processing performed on the image. In the present embodiment, the throwing of a punch is detected as an event.

The object detection unit 205 reads, from the video storage unit 202, several past frames of images previous to the image serving as the detection origin in which the event was detected by the event detection unit 203. The object detection unit 205 then detects, from each read image, the objects serving as contact determination targets that are registered in the above table information in association with the event detected from the image. The head and the gloves are detected in the present embodiment.

In the case of detecting the head, occlusion by the gloves arises depending on the camera angle. The method disclosed in the above Document 3 is one object detection method compatible with occlusion. In Document 3, first, portions constituting an object are detected, and a detection result for the entire object is obtained by adding together these detection results through voting. Thus, even in the case where the head is occluded to some extent by a glove, as in the present embodiment, it is possible to correctly perform detection and orientation of the head. If the rate of occlusion is high and most of the head is hidden, detection cannot be performed even if using the method of Document 3. In this case, it is assumed that an image of a viewpoint from which the head was not detected will not contribute to contact determination.

The contact determination unit 206 derives, for each image in which the object detection unit 205 detects a head and a glove, the distance between the detection position of the head and the detection position of the glove in the image, and, if the distances derived for all of the images are not greater than a threshold, determines that the head and the glove come in contact with each other.

The result display unit 207 selects one of the frames in which it was determined that the head and the glove come in contact, and displays the image of the selection frame on a display device connected to the behavior recognition apparatus 200. The form of display is, similarly to the first embodiment, not limited to a specific form of display.

Figure 10:
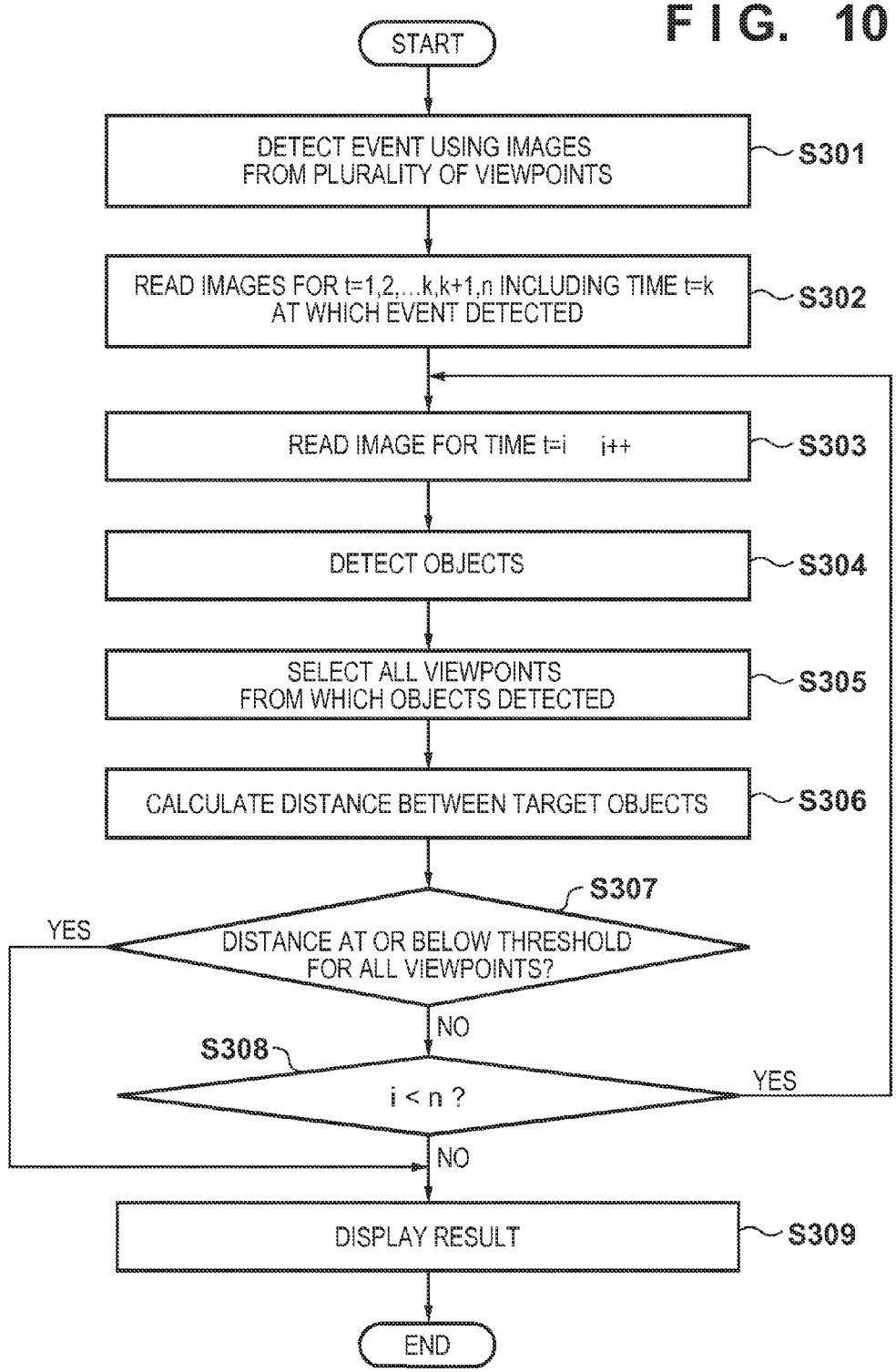
FIG. 10 is a flowchart of processing performed by the behavior recognition apparatus 200.

Next, operations of the behavior recognition apparatus 200 described above will be described using the flowchart in FIG. 10. Because the processing in accordance with the flowchart in FIG. 10 is processing performed on one frame image, the processing in accordance with the flowchart in FIG. 10 is actually performed for each frame. In the following description, processing performed on the image of frame t will be described. Note that since the details of the processing in each step are as described above, a brief description will be given here.

At step S301, the event detection unit 203 detects an event occurring in the images of frame t, which are images received from the image input unit 201 that were captured by the respective image sensing devices.

At step S302, the object detection unit 205 reads, for each image serving as a detection origin in which the event was detected, among the images of frame t captured by the respective image sensing devices, several past frames of images previous to the image from the video storage unit 202.

At step S303, the object detection unit 205 selects the image of an unselected k-th frame from among the several past frames of images read from the video storage unit 202 for each image serving as a detection origin in which the event was detected.

At step S304, the contact determination unit 206 detects the head and the glove from the image of the k-th frame selected for each image serving as a detection origin in which the event was detected.

At step S305, the contact determination unit 206 selects, as selection images, images in which the head and the glove could be detected among the images of the k-th frame selected for each image serving as a detection origin in which the event was detected.

At step S306, the contact determination unit 206 derives, for each selection image, the distance between the detection position of the head and the detection position of the glove in the selection image. If the distances derived for all of the selection images are not greater than a threshold, the processing advances to step S309 via step S307, and if one or more of the distances are greater than the threshold, the processing advances to step S308 via step S307.

At step S308, the object detection unit 205 determines whether the past several frames of images read from the video storage unit 202 for each image serving as a detection origin in which the event was detected have all been selected. If the determination result indicates that all read images have been selected, the processing advances to step S309, and if there remains an image that has not yet been selected, the processing advances to step S303.

At step S309, the result display unit 207 selects one of the frames in which it was determined that the head and the glove come in contact, and displays the selection frame on a display device connected to the behavior recognition apparatus 200. The form of display is, similarly to the first embodiment, not limited to a specific form of display.

Fourth Embodiment

Figure 2:
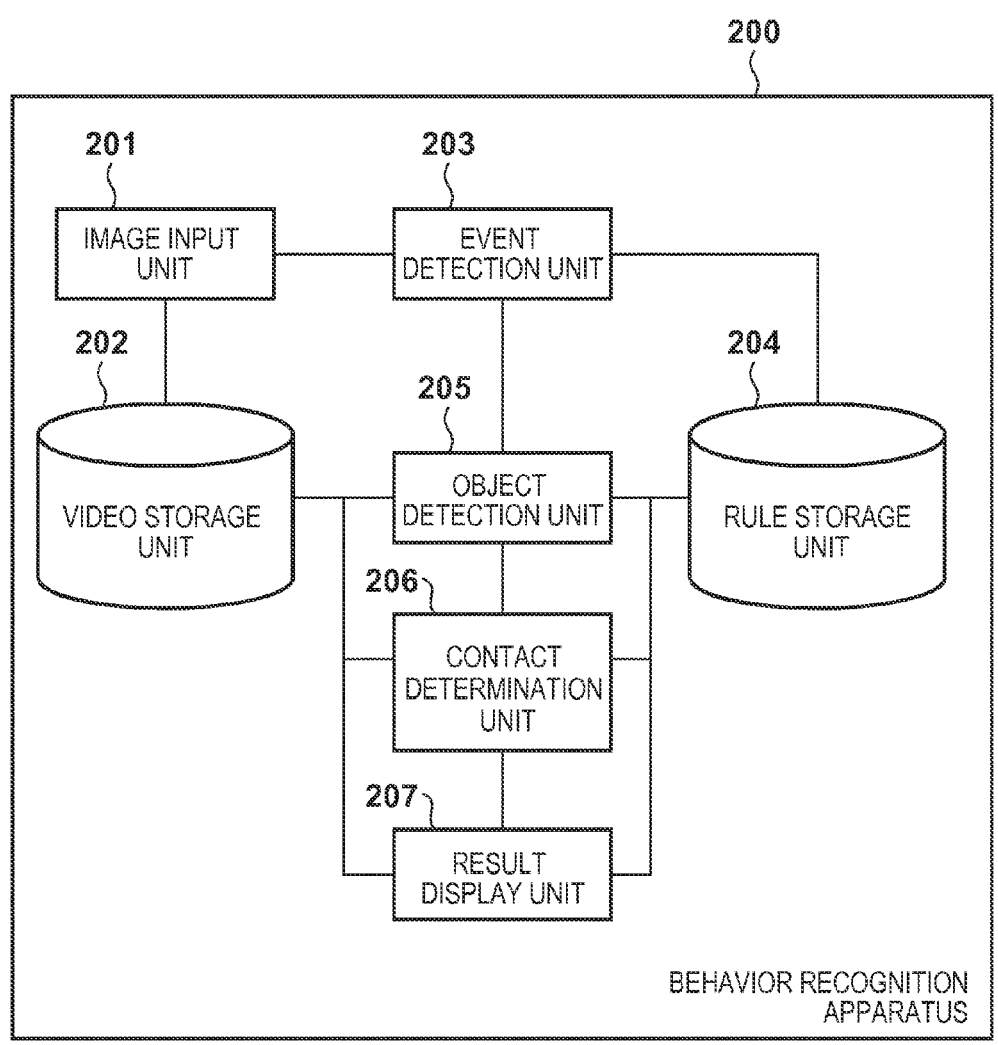
FIG. 2 is a block diagram showing an exemplary functional configuration of a behavior recognition apparatus 200.

Although each of the units shown in FIG. 2 may be constituted by hardware, the video storage unit 202 and the rule storage unit 204 may be constituted by a memory device such as a hard disk drive device, and the remaining units may be constituted by computer programs. In this case, a computer such as a general personal computer (PC) can be applied as the behavior recognition apparatus 200.

For example, the groups of data described as being stored by the video storage unit 202 and the rule storage unit 204 will be stored in the hard disk drive device of the PC. Furthermore, computer programs and data for causing the CPU of the PC to perform the respective processing described above as being performed by the image input unit 201, the event detection unit 203, the object detection unit 205, the contact determination unit 206 and the result display unit 207 will be stored in the hard disk drive device. The CPU is thereby able to load a computer program and data that are stored in the hard disk drive device into a memory such as RAM, and execute processing using the computer program and data. The CPU is thereby able to execute the respective processing mentioned above as being performed by the behavior recognition apparatus 200.

Fifth Embodiment

In the present embodiment, an example is described in which abandonment of an object is detected by a surveillance camera, and the person who abandoned the object is also specified. There are surveillance cameras that are provided with a mechanism for detecting abandonment and removal of objects, using a video recognition function. Abandonment of an object denotes a state where an object such as a bag is left unattended in a scene that is being monitored, and a recognition function for detecting this has been developed from the viewpoint of terror prevention. Removal of an object denotes a state where an object such as a painting is carried off in a scene that is being monitored, and a recognition function for detecting this has been developed from the viewpoint of theft prevention.

Detection of abandonment and removal of objects can be realized by comparatively simple video processing, using a background difference method that involves comparing an image captured in advance with the currently captured image. In the present embodiment, after detecting abandonment, the person who abandoned the object is specified by further video recognition processing.

Figure 13A:
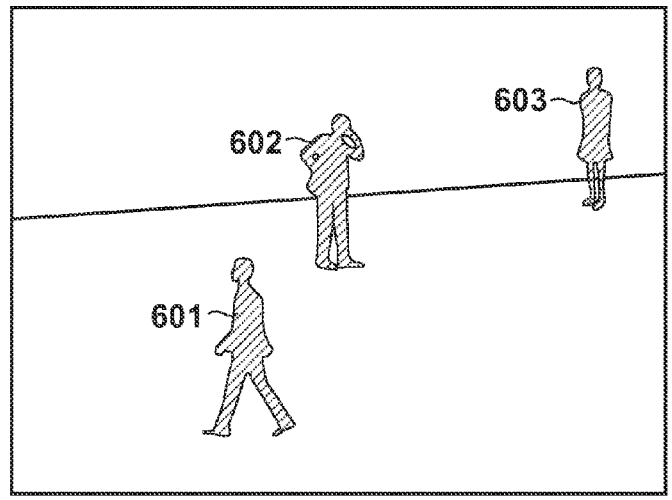
FIGS. 13A to 13C are diagrams showing video images captured by a surveillance camera in a fifth embodiment.
Figure 13B:
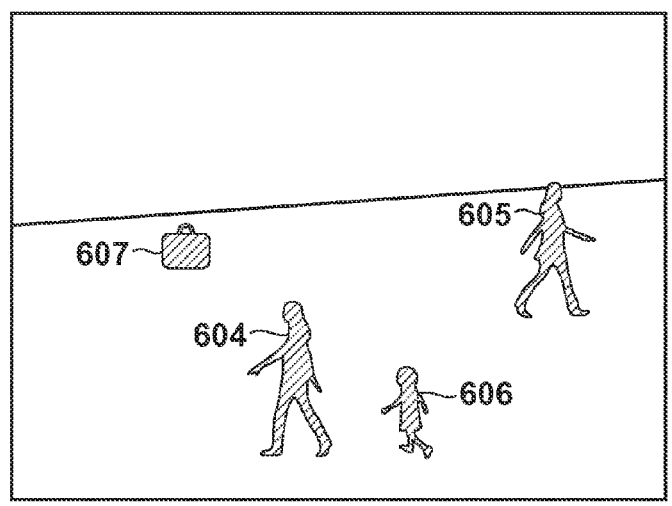
Figure 13C:
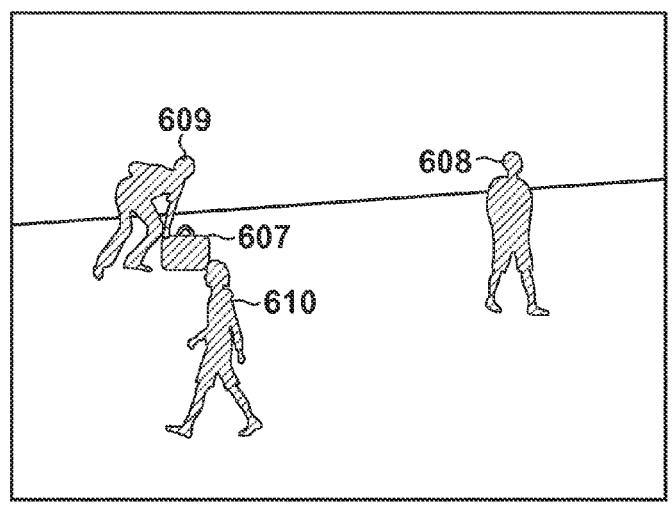

FIGS. 13A to 13C show three frames of images from video images captured by a surveillance camera installed on the street. FIG. 13A shows the image of a frame at a point in time before the abandonment occurs, FIG. 13B shows the image of a frame at a point in time after the abandonment has occurred, and FIG. 13C shows the image of a frame at the moment that the abandonment occurs. In FIGS. 13A to 13C, reference numerals 601, 602, 603, 604, 605, 606, 608, 609 and 610 denote respectively different people, and 607 denotes the object that is abandoned.

Figure 15:
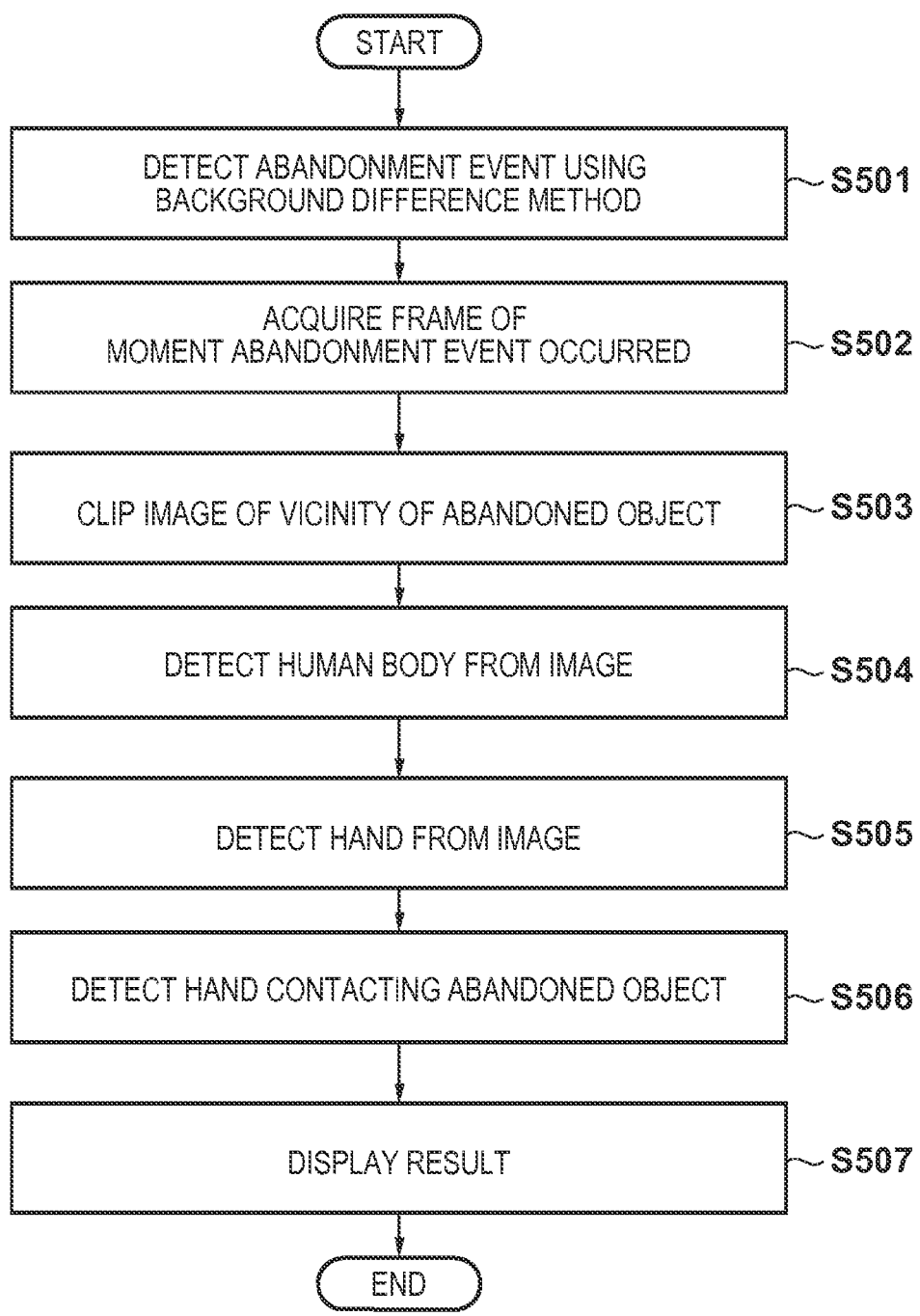
FIG. 15 is a flowchart of processing performed by the behavior recognition apparatus 200 in the fifth embodiment.
Figure 19:
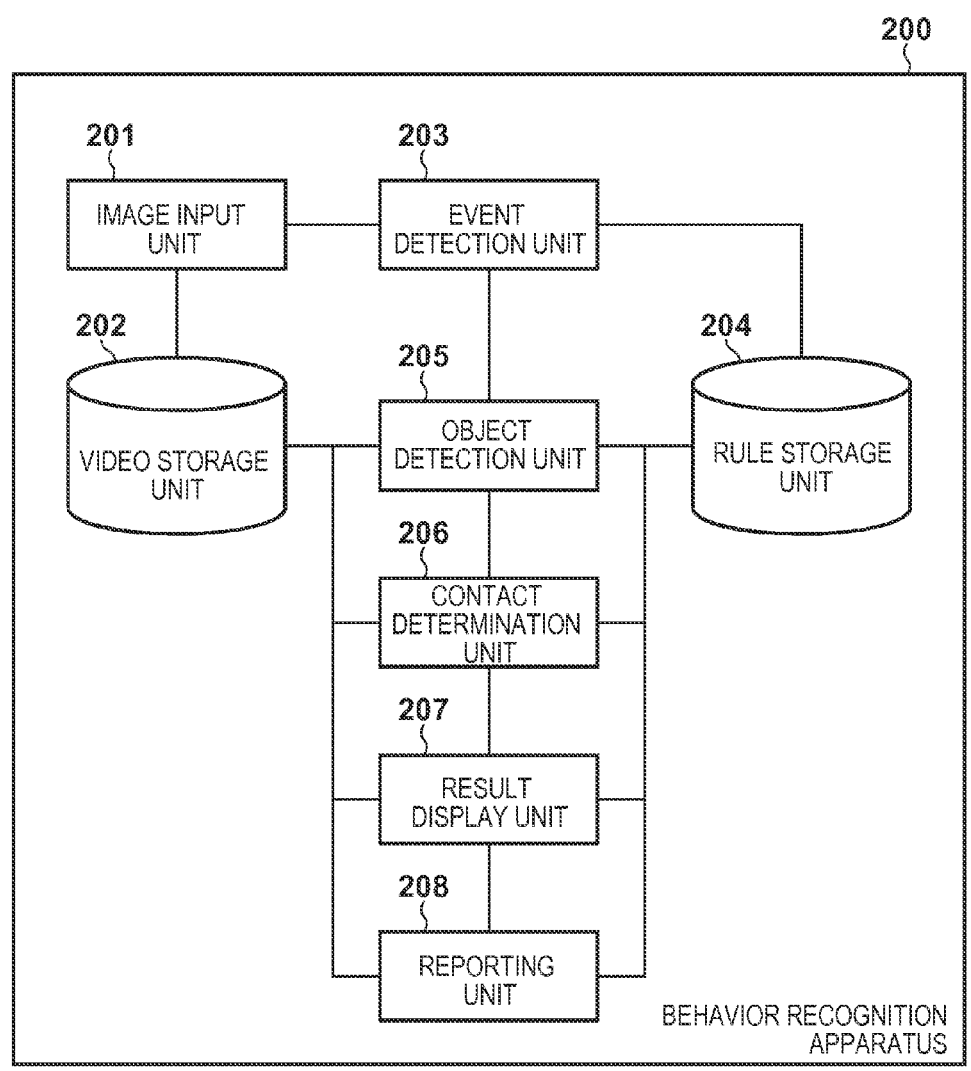
FIG. 19 is a block diagram showing an exemplary functional configuration of the behavior recognition apparatus 200.

An exemplary functional configuration of the behavior recognition apparatus according to the present embodiment that functions as an image processing apparatus is represented with the block diagram of FIG. 19. The configuration shown in FIG. 19 is obtained by adding a reporting unit 208 to the configuration in FIG. 2. The reporting unit 208 is a functional unit for receiving a result of behavior recognition and reporting the result to the outside, and is constituted by a speaker provided in a surveillance camera, a communication line to the outside, or the like. Operations of the behavior recognition apparatus in the present embodiment will be described using the flowchart in FIG. 15.

At step S501, the event detection unit 203 detects an abandonment event from the image received from the image input unit 201. Detection of an abandonment event is performed as follows, for example. Detection is performed by a general algorithm that creates a difference image between a background image captured in advance and the image of an input frame, and determines that abandonment has occurred if a difference region of interest (region that is different between frames) in the difference image is obtained from the difference image for a given number of frames or more. Note that detection of an abandonment event may be performed using any technique that is able to detect abandonment.

At step S502, the object detection unit 205, in the case where an abandonment event is detected, reads the image of the frame at the moment that the abandonment occurs (image of frame in which a different from the background image was calculated at step S501) from the video storage unit 202. FIG. 13C illustrates the image of the frame read at step S502.

At step S503, the object detection unit 205 clips a rectangular region that includes the region in which the abandoned object appears from the image read at step S502.

Figure 14:
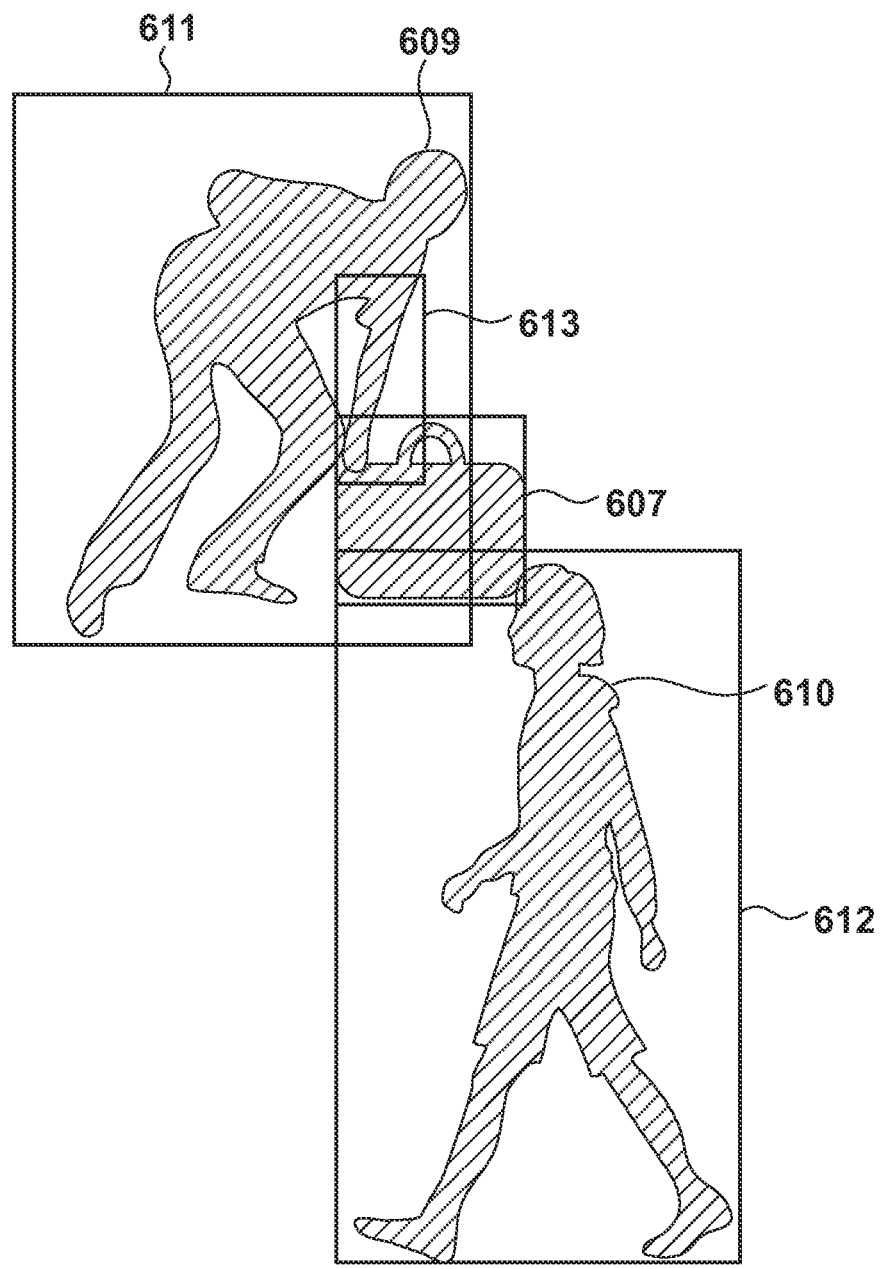
FIG. 14 is a diagram showing partial images clipped from a video image captured by a surveillance camera.

For example, a rectangular region of predetermined size centering on the region in which the abandoned object appears is clipped from the image read at step S502. FIG. 14 shows a partial image clipped from the image in FIG. 13C at step S503.

At step S504, the object detection unit 205 detects regions in which a person appears from the partial image clipped at step S503. In relation to detection of regions in which a person appears, for example, a technique for detecting regions in which a person appears using HOG feature amounts, as with the method described in Document 4 below, can be used. HOG feature amounts are obtained by transforming the gradient direction and intensity of the luminance of a local region into a histogram, and are feature amounts that are effective in detecting objects having diverse textures such as people.

Document 4: N. Dalal and B. Triggs, "Histograms of Oriented Gradients for Human Detection", CVPR 2005.

Reference numerals 611 and 612 in FIG. 14 show the regions detected at step S504 with bounding boxes. At step S505, the object detection unit 205 detects a person's hand from the regions in which a person appears. Detection of a hand is perfumed because abandonment of an object is primarily carried out by a person using his or her hands. Detection of a hand is performed by a method using a detector shown in Document 3, for example, similarly to the first embodiment.

A configuration may be adopted in which, when a hand is detected, the person to which the detected hand belongs is also detected. For example, the Deformable Parts Model described in Document 5 below is a technique that is able to detect a human body using the positional relationship between a detection window that covers the entire body of a person and filters that cover body parts. By using such a technique, when a hand is detected, it is possible to simultaneously detect the human body to which the hand belongs.

Document 5: P. F. Felzenszwalb, et al., "Object Detection with Discriminatively Trained Part Based Models", PAMI 2009.

At step S506, the contact determination unit 206 determines whether the hand detected at step S505 is in contact with the abandoned object. This determination is performed by checking whether there is an overlapping region between the bounding box of the abandoned object and the bounding box of the detected hand. For example, in FIG. 14, since the bounding box of the detected hand 613 and the bounding box of the abandoned object 607 overlap, it is determined that the hand and the abandoned object come in contact.

At step S507, the result display unit 207 performs display relating to the determination result of step S506. In the example in FIG. 14, the human body 609 that is nearest to the hand 613 that is in contact with the abandoned object 607 is specified as the person who abandoned the object, and the human body 609 is highlighted on the screen. This is achieved, for example, by displaying the bounding box of the human body 609 or causing the bounding box to flash, when displaying the image of each frame.

Alternatively, in the case where the human body to which the detected hand belongs is detected in step S505, the human body 609 to which the contacting hand 613 belongs is specified as the person who abandoned the object.

In this process, not only displaying the result but also the reporting unit 208 may performs reporting. For example, a configuration may be adopted in which a warning sound is emitted from a speaker provided in the surveillance camera or a report is sent to the police or a security company along with a captured image (e.g., the image displayed by the result display unit 207).

A system for detecting abandonment of an object using a surveillance camera and for also specifying the person who abandoned the object can be realized, by providing a behavior recognition apparatus that performs the above operations. Although specification of a person who abandons an object is described in the present embodiment, a system for specifying a person who removes an object, such as a person who steals an object, can be realized with a similar technique.

Sixth Embodiment

Figure 16A:
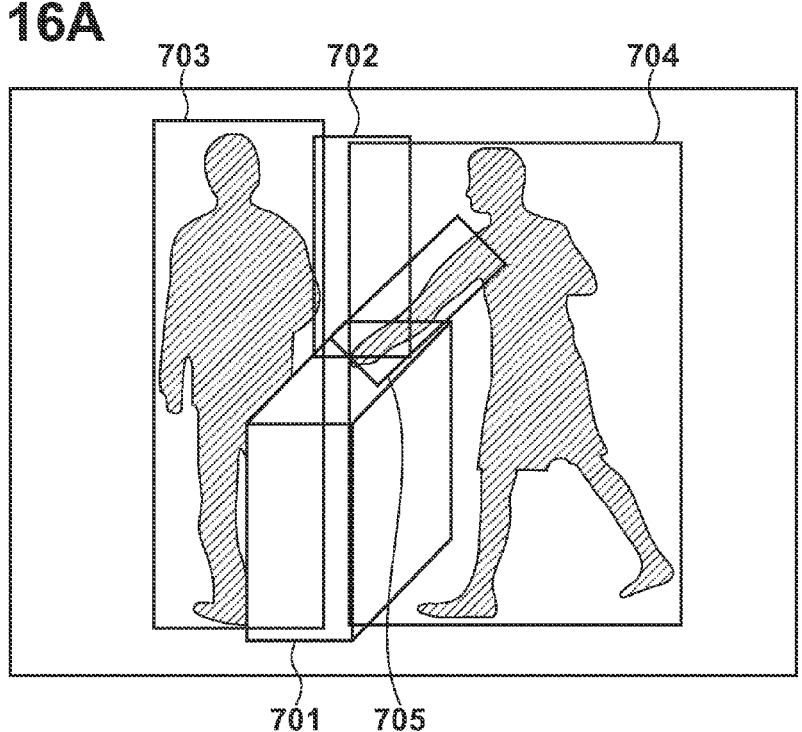
FIGS. 16A and 16B are diagrams showing video images captured by a surveillance camera in a sixth embodiment.
Figure 16B:
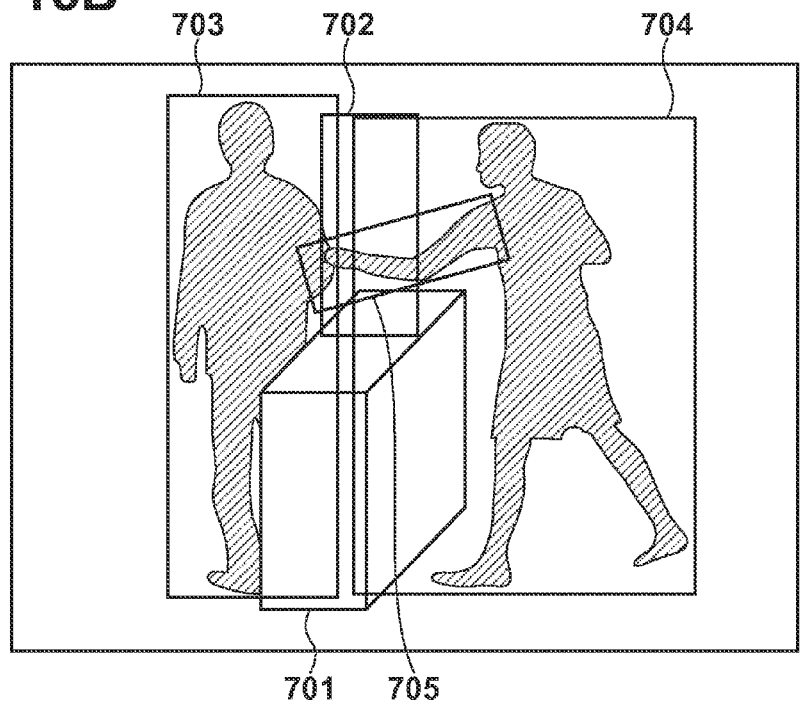

In the present embodiment, an example is described in which a violent action on a shop worker is detected by a surveillance camera disposed so as to capture the vicinity of the cash register at a retail store. FIGS. 16A and 16B each illustrate one frame of a video image captured by the surveillance camera in the present embodiment. FIG. 16A shows an image capturing the moment when a customer pays the shop worker, and FIG. 16B shows an image capturing the moment when the customer becomes violent towards the shop worker.

Figure 17:
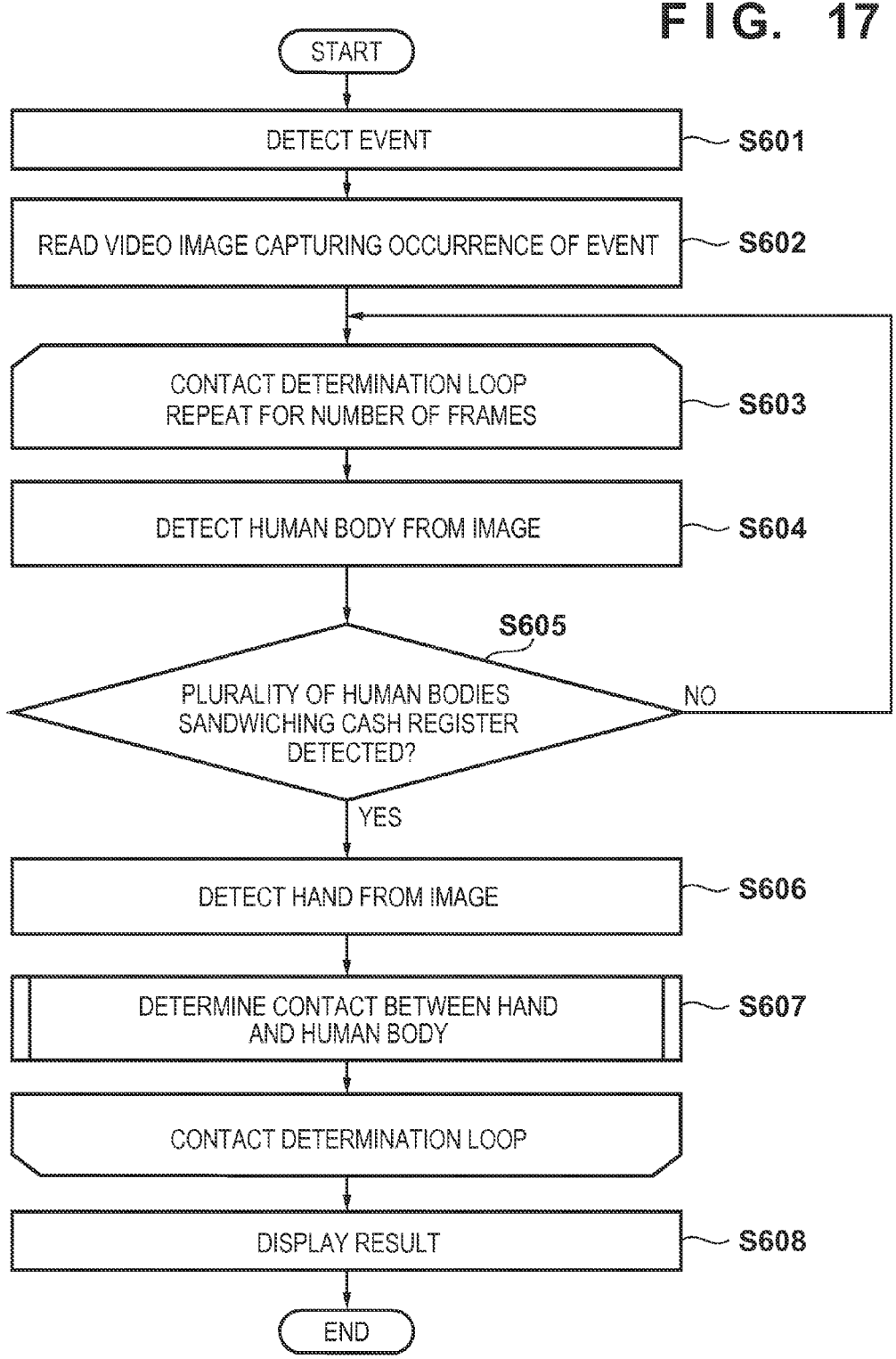
FIG. 17 is a flowchart of processing performed by the behavior recognition apparatus 200 in the sixth embodiment.

An exemplary functional configuration of a behavior recognition apparatus according to the present embodiment that functions as an image processing apparatus is represented with the block diagram of FIG. 19, similarly to the fifth embodiment. Operations of the behavior recognition apparatus according to the present embodiment will be described using the flowchart in FIG. 17.

At step S601, the event detection unit 203 detects an event that has occurred in the vicinity of the cash register from the image received from the image input unit 201. In the present embodiment, this event detection is performed by monitoring changes in the pixel values of a rectangular region 702 that is derived and set in advance from the information on a region, shown in FIG. 16A, in which a cash register 701 appears. The event detection unit 203 determines that some kind of event has occurred in the vicinity of the cash register, when the sum of changes in pixel values in the rectangular region 702 is greater than or equal to a predetermined threshold.

At step S602, the object detection unit 205 reads, from the video storage unit 202, the image of each frame in which it is determined that some kind of event has occurred at step S601. The loop from step S603 to step S607 is a contact determination loop, and indicates a procedure for processing the image of each frame read at step S602 in order from the lead frame. In the present embodiment, this loop is repeated for all of the frames read at step S602. However, the present embodiment is not limited thereto, and a configuration may be adopted in which a frame is extracted every five frames from the lead frame, for example, and the processing in the loop is executed on the image of the extracted frame.

At step S604, the object detection unit 205 selects, as a selection image, one unprocessed image from among the images of the frames read at step S602, and detects regions in which a person appears from the selection image using a similar technique to the fifth embodiment. Reference numeral 703 in FIGS. 16A and 16B denotes the body of the shop worker detected in step S604, and 704 denotes the body of the customer.

At step S605, the object detection unit 205 determines whether human bodies, that is, the shop worker and the customer, were detected, from the selection image, on both sides sandwiching the region in which the cash register appears. If the shop worker and the customer were detected, the processing advances to step S606, and if they were not detected, the processing returns to step S603.

At step S606, the object detection unit 205 detects a hand from the selection image. Here, detection of a hand is performed because it is envisioned that violence on a shop worker will be carried out by a person using his or her hands. The detection of a hand is, similarly to the first embodiment, performed by a method using a detector shown in Document 3, for example. Reference numeral 705 in FIGS. 16A and 16B denotes the bounding box of a hand that was detected in this way. It is also determined whether the hand detected in this process belongs to the shop worker or to the customer.

At step S607, the contact determination unit 206 determines whether the hand detected at step S606 is in contact with a human body. This determination is performed by the processing shown in the flowchart of FIG. 18.

Figure 18:
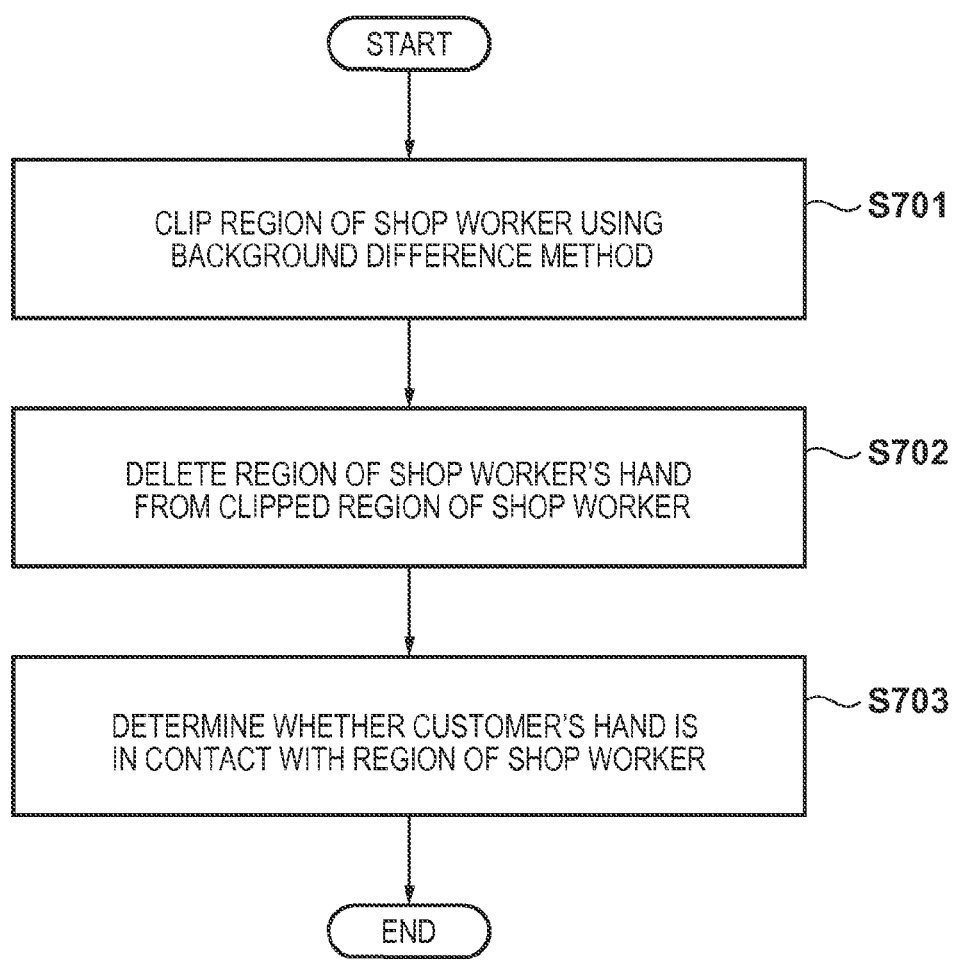
FIG. 18 is a flowchart of processing performed by the behavior recognition apparatus 200 in the sixth embodiment.

At step S701 in FIG. 18, the contact determination unit 206 clips only the region of the shop worker from the selection image by background difference processing. The method for clipping the region of a specific subject from an image is as described above.

At step S702, the contact determination unit 206 then specifies, as a target region, the region remaining after deleting the region of the shop worker's hand detected at step S606 from the clipped region of the shop worker. At step S703, the contact determination unit 206 then determines whether the target region, that is, the region of the shop worker's body, overlaps with the region of the customer's hand detected at step S606.

The region of the shop worker's hand is removed from being targeted for contact determination in the processing flow shown in FIG. 18, in order to remove contact between the hands of the shop worker and the customer that arises frequently when exchanging money or the like at the cash register from being targeted for contact determination.

Returning to FIG. 17, once the processing of steps S603 to S607 has been performed for all of the frames read at step S602, the processing advances to step S608. At step S608, the result display unit 207 displays the result. No result is displayed if contact between the customer's hand and the shop worker's body cannot be seen in any of the frames. If there was contact between the customer's hand and the shop worker's body (the region of the shop worker's body overlaps with the region of the customer's hand detected at step S606), a bounding box showing the detected body region in a corresponding frame image is drawn in red, and composited into the image of that frame. The form of display is, of course, not limited thereto. In addition or alternatively, the bounding box indicating the region of the customer may be drawn in red and composited into the image, and the form of display is, of course, not limited thereto.

In this process, not only displaying the result, but also the reporting unit 208 may report the event outside of the store. For example, a configuration may be adopted in which a light installed outside the store is caused to flash, or a report is sent to the police or a security company along with a captured image.

Effects of First to Third Embodiments

In the first embodiment, a sliding movement is detected, and the foot and the ball are selected as targets that are detected in order to determine whether the sliding movement infringes the rules. Only objects required for rule determination are targeted for detection, thereby realizing the effect of reducing calculation cost.

Also, in the first embodiment, contact determination is performed using the fact that a change in the velocity and/or the acceleration of target objects occurs at the time that the distance between the target objects decreases to below a threshold. This has the effect of enabling contact determination to be performed more accurately than when using only still images.

Also, in the third embodiment, contact between objects is determined utilizing the condition that the distance between objects be within a threshold for all images captured from a plurality of viewpoints. This has the effect of enabling contact to be correctly determined even in the case where determination is difficult from any one viewpoint.

Also, in the third embodiment, it is possible to determine contact between target objects without using captured images of all viewpoints, by selecting and using images of the viewpoints from which the objects were detected, and the effect of being able to reduce the calculation cost of contact determination is realized.

Also, in the second embodiment, contact determination is performed by selecting and using an image of a viewpoint from which the output of the event detection unit increases, among images from a plurality of viewpoints. It is possible to perform contact determination of target objects without using captured images of all viewpoints, thereby realizing the effect of being able to reduce the calculation cost of contact determination.

Also, in the third embodiment, an image of a viewpoint from which a target object could not be detected by the object detection unit is not used in the contact determination processing. The effect of improving the accuracy of contact determination, compared with the case where images from all of the viewpoints are used, is thereby achieved.

Also, in the first to third embodiments, an object detection window that serves as a basis for contact determination is displayed by superimposition on the image used in the contact determination. This has the effect of enabling the user to easily check the determination result.

Definitions for First to Third Embodiments and Other Matters

An "event" as used in each of the above embodiments may be any event involving an action or a situation in a sport, such as a specific play during a sport, a specific movement or the like, and is not limited to the description given in the above embodiments.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications Nos. 2012-087934 filed Apr. 6, 2012 and 2013-017636 filed Jan. 31, 2013, which are hereby incorporated by reference herein in their entirety.

What is claimed is:

1. An image processing apparatus comprising:
a holding unit that holds, for each event which may occur in an image, a type of an object to be determined whether or not to come in contact with another object in a physical space, wherein the holding unit is configured to hold in advance, for each event, an object type which is preset in advance as a type of an object to be determined whether or not to come in contact with another object in the physical space;
a unit that sequentially acquires an image of each frame output from an image sensing device;
a first detection unit that detects, before performing an object detection on an image of interest, an event which occurs in the image of interest;
a specifying unit that specifies, from object types each of which is held in advance in the holding unit and is preset in advance as a type of an object to be determined whether or not to come in contact with another object in the physical space, the object type which corresponds to the event detected by the first detection unit;
a second detection unit that detects an object of the object type specified by the specifying unit from the image of interest; and
a determination unit that determines whether objects detected by the second detection unit come in contact with each other in the physical space,
wherein the first detection unit detects a first event, and the specifying unit specifies, from the holding unit, a first object type and a second object type as the object types which correspond to the first event, and
the determination unit:
sets an image, among the images of the frames, in which a distance between respective detection positions, in the image, of a first object corresponding to the first object type and a second object corresponding to the second object type is equal to or less than a threshold, as a target image, and
determines that the first object and the second object come in contact with each other in the physical space, if a magnitude of acceleration, in the target image, of the first object is greater than or equal to a threshold, and an angle formed by a vector representing the acceleration and a vector representing velocity, in the target image, of the second object is less than a threshold.

2. The image processing apparatus according to claim 1, wherein the first detection unit performs an event detection with respect to an image output from each of a plurality of image sensing devices, the specifying unit specifies, from the holding unit, the object type corresponding to the event detected by the first detection unit, and the second detection unit detects the object of the object type specified by the specifying unit, from an image having a highest event occurrence probability calculated at a time of the detection among the images output from the plurality of image sensing devices.

3. The image processing apparatus according to claim 1, wherein the detection unit detects a person who abandons or removes an object.

4. The image processing apparatus according to claim 1, wherein the determination unit determines whether there is a violent action.

5. The image processing apparatus according to claim 1, further comprising a reporting unit that reports information corresponding to a result in which the determination unit determines that the objects come in contact.

6. An image processing method that is performed by an image processing apparatus, comprising:
holding, for each event which may occur in an image, a type of an object to be determined whether or not to come in contact with another object in a physical space, wherein the holding holds in advance, for each event, an object type which is preset in advance as a type of an object to be determined whether or not to come in contact with another object in the physical space;
sequentially acquiring an image of each frame output from an image sensing device;
detecting, before performing an object detection on an image of interest, an event which occurs in the image of interest;
specifying, from object types each of which is held in advance in the holding step and is preset in advance as a type of an object to be determined whether or not to come in contact with another object in the physical space, the object type which corresponds to the event detected by the first detection step;
detecting an object of the object type specified by the specifying step from the image of interest; and
determining whether objects come in contact with each other in the physical space, based on a result of the detection,
wherein the first detection step detects a first event, and the specifying step specifies, from the holding step, a first object type and a second object type as the object types which correspond to the first event, and
the determining step:
sets an image, among the images of the frames, in which a distance between respective detection positions, in the image, of a first object corresponding to the first object type and a second object corresponding to the second object type is equal to or less than a threshold, as a target image, and
determines that the first object and the second object come in contact with each other in the physical space, if a magnitude of acceleration, in the target image, of the first object is greater than or equal to a threshold, and an angle formed by a vector representing the acceleration and a vector representing velocity, in the target image, of the second object is less than a threshold.

7. A non-transitory computer-readable storage medium storing a computer program for a computer having a holding unit that holds, for each event which may occur in an image, a type of an object to be determined whether or not to come in contact with another object in a physical space, wherein the holding unit is configured to hold in advance, for each event, an object type which is preset in advance as a type of an object to be determined whether or not to come in contact with another object in the physical space, the program for causing the computer to function as:
an acquisition unit that sequentially acquires an image of each frame output from an image sensing device;
a first detection unit that detects, before performing an object detection on an image of interest, an event which occurs in the image of interest;
a specifying unit that specifies, from object types of each of which is held in advance in the holding unit and is preset in advance as a type of an object to be determined whether or not to come in contact with another object in the physical space, the object type which corresponds to the event detected by the first detection unit;

a second detection unit that detects an object of the object type specified by the specifying unit from the image of interest; and a determination unit that determines whether objects detected by the second detection step come in contact with each other in the physical space, wherein the first detection unit detects a first event, and the specifying unit specifies, from the holding unit, a first object type and a second object type as the object types which correspond to the first event, and the determination unit:

sets an image, among the images of the frames, in which a distance between respective detection positions, in the image, of a first object corresponding to the first object type and a second object corresponding to the second object type is equal to or less than a threshold, as a target image, and determines that the first object and the second object come in contact with each other in the physical space, if a magnitude of acceleration, in the target image, of the first object is greater than or equal to a threshold, and an angle formed by a vector representing the acceleration and a vector representing velocity, in the target image, of the second object is less than a threshold.

8. The apparatus according to claim 1, wherein the holding unit holds, for each event which may occur in the image, the first object type of the first object whose acceleration and velocity are to be calculated and the second object type of the second object whose velocity is to be calculated.

9. The apparatus according to claim 1, wherein the first detection unit detects, before performing the object detection on the image of interest, the event which occurs in the image of interest using image features of the image of interest.

10. An image processing apparatus, comprising:

an acquisition unit that acquires a target frame image which includes a first object and a second object;

a first calculation unit that calculates a distance between the first object and the second object on the acquired target frame image;

a second calculation unit that calculates acceleration of the first object and velocity of the second object on the acquired target frame image; and a determination unit that determines, in a case where on the target frame image (A) the calculated distance is not more than a first threshold, (B) the calculated acceleration is not less than a second threshold, and (C) an angle formed by a vector representing the calculated acceleration and a vector representing the calculated velocity is less than a third threshold, that the first object comes in contact with the second object.

11. The apparatus according to claim 10, further comprising:

a first detection unit that detects a specific event from a plurality of frame images; and an extraction unit that extracts, from the plurality of frame images, at least one frame image which includes the detected specific event, wherein the acquisition unit acquires as the target frame image, a single frame image from the at least one frame images extracted by the extraction unit.

12. The apparatus according to claim 11, further comprising a second detection unit that detects, from the target frame image, the first object and the second object each of which is associated with the specific event detected by the first detection unit.

13. The apparatus according to claim 11, wherein the first detection unit detects, from a plurality of frame images obtained by capturing a soccer game, a sliding tackle as the specific event, and the second detection unit detects a ball as the first object and detects a foot of a player as the second object.

14. An image processing method, comprising:

acquiring a target frame image which includes a first object and a second object;

calculating a distance between the first object and the second object on the acquired target frame image;

calculating acceleration of the first object and velocity of the second object on the acquired target frame image; and determining, in a case where on the target frame image (A) the calculated distance is not more than a first threshold, (B) the calculated acceleration is not less than a second threshold, and (C) an angle formed by a vector representing the calculated acceleration and a vector representing the calculated velocity is less than a third threshold, that the first object comes in contact with the second object.

15. A non-transitory computer-readable storage medium storing a computer program for causing a computer to execute an image processing method, the method comprising:

acquiring a target frame image which includes a first object and a second object;

calculating a distance between the first object and the second object on the acquired target frame image;

calculating acceleration of the first object and velocity of the second object on the acquired target frame image; and determining, in a case where on the target frame image (A) the calculated distance is not more than a first threshold, (B) the calculated acceleration is not less than a second threshold, and (C) an angle formed by a vector representing the calculated acceleration and a vector representing the calculated velocity is less than a third threshold, that the first object comes in contact with the second object.

* * * * *